US010932424B2

(12) United States Patent
Larsen

(10) Patent No.: US 10,932,424 B2
(45) Date of Patent: Mar. 2, 2021

(54) SYSTEM FOR COMMUNICATING AND MONITORING MOISTURE CONTENT IN AN IRRIGATION SYSTEM

(71) Applicant: Smart Rain Systems, LLC, Centerville, UT (US)

(72) Inventor: Rudy Lars Larsen, Bountiful, UT (US)

(73) Assignee: Smart Rain Systems, LLC, Centerville, UT (US)

(*) Notice: Subject to any disclaimer, the term of this patent is extended or adjusted under 35 U.S.C. 154(b) by 0 days.

(21) Appl. No.: 15/274,593

(22) Filed: Sep. 23, 2016

(65) Prior Publication Data

US 2018/0084742 A1 Mar. 29, 2018

(51) Int. Cl.
G05B 19/042 (2006.01)
A01G 25/16 (2006.01)

(52) U.S. Cl.
CPC ......... *A01G 25/167* (2013.01); *G05B 19/042* (2013.01); *G05B 2219/2625* (2013.01)

(58) Field of Classification Search
CPC ............... A01G 25/167; B05B 12/084; G05B 19/0428; G05B 2219/2625; G05B 19/042; G05D 7/0617
See application file for complete search history.

(56) References Cited

U.S. PATENT DOCUMENTS

| | | | | |
|---|---|---|---|---|
| 8,862,277 | B1 * | 10/2014 | Campbell | A01G 25/167 324/664 |
| 2006/0248723 | A1 * | 11/2006 | Gustafson | D21F 3/06 29/895.32 |
| 2006/0254366 | A1 * | 11/2006 | Williamson | G01L 1/20 73/786 |
| 2008/0055069 | A1 * | 3/2008 | Aiki | H04W 52/029 340/539.3 |
| 2011/0248846 | A1 * | 10/2011 | Belov | H04Q 9/00 340/539.1 |

(Continued)

OTHER PUBLICATIONS

Simulation of an Event-Driven Wireless Sensor Network Protocol for Environmental Monitoring. Article. [online]. Maher Ali Al Rantisi , 2014 [retrieved on Jan. 9, 2019]. Retrieved from internet: <URL: https://ieeexplore.ieee.org/abstract/document/6933220> (Year: 2014).*

*Primary Examiner* — Robert E Fennema
*Assistant Examiner* — Marzia T Monty
(74) *Attorney, Agent, or Firm* — Dentons Durham Jones Pinegar; James A. Larson; Sarah W. Matthews

(57) ABSTRACT

A system and method for providing optimal irrigation or watering, and more specifically providing a soil sensor grid placed in the ground of a landscaped property, in commercial, residential or even agricultural areas. The soil sensor grid can allow for optimal water usage in a specified irrigation area by providing real time data to an irrigation system and a user to optimize water usage. A soil sensor grid, or moisture sensor grid, may be installed on a property, buried in the ground, to provide current and real time feedback of the current moisture levels of the soil. The moisture data is uploaded to the cloud and provided to a user and the irrigation system allowing a user to automatically or manually manipulate the irrigation system to properly water or irrigate different portions of the property based on the data from the soil sensor grid.

22 Claims, 4 Drawing Sheets

(56) References Cited

U.S. PATENT DOCUMENTS

| | | | |
|---|---|---|---|
| 2014/0236868 A1* | 8/2014 | Cook | A01G 25/16 705/412 |
| 2015/0070192 A1* | 3/2015 | Kates | G08B 17/00 340/870.39 |
| 2016/0057949 A1* | 3/2016 | Williams | A01G 25/167 700/284 |
| 2016/0157446 A1* | 6/2016 | Bentwich | A01G 25/167 700/284 |
| 2017/0332566 A1* | 11/2017 | Emory | F16K 31/001 |

* cited by examiner

SYSTEM FOR COMMUNICATING AND MONITORING MOISTURE CONTENT IN AN IRRIGATION SYSTEM

TECHNICAL FIELD

This disclosure relates generally to irrigation management, and more specifically to providing a soil sensor grid, placed in the ground of a landscaped property, in commercial, residential or even agricultural areas. The soil sensor grid can allow for optimal water usage in a specified irrigation area.

BACKGROUND OF RELATED ART

Water is becoming an increasingly scarce resource. This increasing scarcity is pressuring consumers and governments alike to consider how they use water and how they can use it more wisely. The costs of water are also increasing as a result of scarcity, and home owners, farms, businesses and the like are under pressure to reduce costs associated with using water.

Many irrigation users need water to maintain the grounds of their business facilities, their farms or ranches, and their residences. Some estimates speculate that landscape irrigation accounts for nearly one-third of all residential water use, and totals almost nine billion gallons per day. Much of that water is wasted due to inefficient irrigation methods and systems.

As a result, water users are looking for options to reduce water usage without negatively impacting their landscape. However, doing so often requires expertise in landscape irrigation and may require expensive equipment. Furthermore, some water users are unsure whether they will ever recoup the investment they make in the system. Many water users forgo the benefits of more sophisticated irrigation systems and waste water as a result.

In addition, many irrigation systems can over water or under water because there is no feedback from the soil to know if the grounds are getting enough or too much water. Distribution of water is consistently one of the biggest problems in the irrigation and sprinkler industry.

Some irrigation systems are able to access information on the cloud, such as weather forecasts, temperature forecasts and other information to manipulate the irrigation system and its watering duration. Some systems also utilize the evapotranspiration (ET) information for a local area. However, sadly this information may not be very sight specific or landscape specific for a landscape owner or manager.

BRIEF SUMMARY OF THE INVENTION

Disclosed herein is a system and method for providing optimal water usage for a specific area of a property or landscape, whether that is a commercial business, a residential neighborhood, a park, a farm or ranch or other landscape. In one embodiment a plurality of sensors may be placed in the ground in a landscaped area. The sensors may be positioned in a grid like formation or alternatively in a strategic pattern within a landscape to optimize the usage of a sensor to sense the condition, or moisture level, of the soil.

The soil sensor grid may be developed with an irrigation management plan for a specific property using characteristics of the property and thus positioning the sensors in the appropriate pattern. Residential landscapes may be somewhat different from commercial landscapes which may be different from agricultural landscapes.

The appropriate system may be placed in an area that has yet to be landscaped our utilized or can be placed in a previously established landscaped area, such as a farm, commercial buildings or residential neighborhoods. The method to install the system may involve visiting the property that is to have an irrigation system installed or that previously had an irrigation system installed. A technician may identify one or more characteristics of the property and what water usage is utilized and what may affect water usage. The technician may develop an irrigation plan based on the property, whether an irrigation system is already in use or if a new irrigation system needs to be developed and installed.

The method may also involve determining a value of irrigation system and the soil sensor system for the property. The system itself will optimize the water usage by the sensors providing feedback to the controller, or smart controller, allowing for only optimum water usage in the appropriate areas where the sensor grid is utilized. The sensor grid may be integrated with the irrigation system and may be wired or wireless, or the sensor grid may be separate from and independent from the irrigation system and may be wired or wireless. The controller may allow for the sensor grid and irrigation system to communicate thus allowing the optimum water usage for the appropriate landscape.

Rather than rely solely on temperatures and forecasted weather the sensor grid will provide real-time feedback to the irrigation system regarding the state of the landscape. This, in turn, provides for optimal water usage while maintaining the landscape in a way that satisfies the property owner. The method and system disclosed herein provides information to the cloud, rather than simply taking information from the cloud.

Other aspects, as well as features and advantages of various aspects, of the present embodiments will become apparent to those of skill in the art though consideration of the ensuing description, the accompanying drawings and the appended claims.

DETAILED DESCRIPTION

Referring in general to the accompanying drawings, various embodiments of the present method and system are illustrated to show the structure and methods for a sensor grid which may be integrated with an irrigation system. Common elements of the illustrated embodiments are designated with like numerals. It should be understood that the figures presented are not meant to be illustrative of actual views of any particular portion of the actual device structure, but are merely schematic representations which are employed to more clearly and fully depict embodiments of the system.

The following provides a more detailed description of ways to implement the present system and method and various representative embodiments thereof. The following description sets forth the proper method of installing and implementing a soil sensor grid system and how the system will interface with a smart controller, or controller, to adequately water specific parts of a property or landscape. In this description, some drawings may illustrate landscapes or irrigation plans and while these are representative of the system they are in no means meant to be restrictive to the illustrated design. The system and method of the embodiments described may be performed in numerous ways and are considered part of this disclosure.

Figure 1:
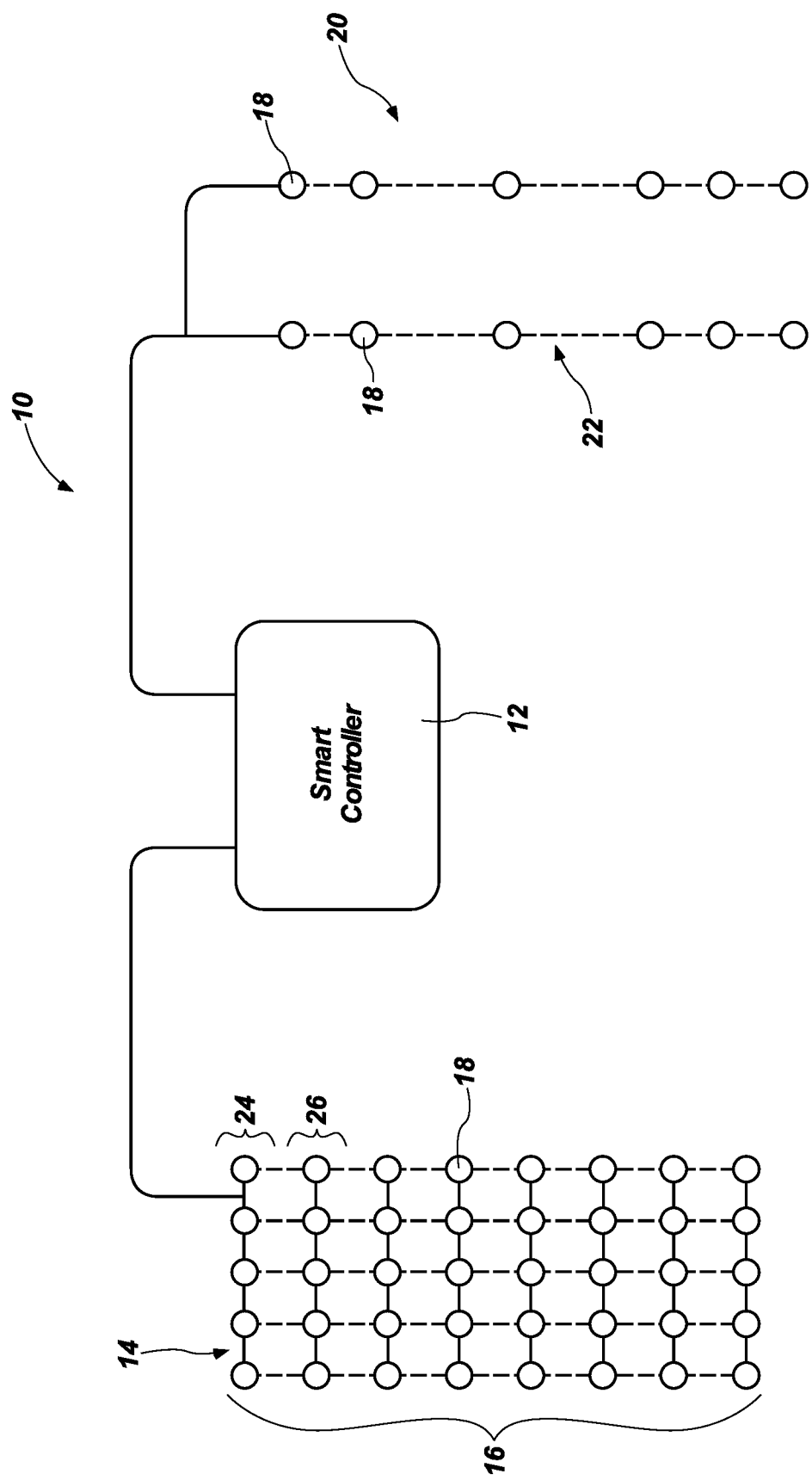
FIG. 1 illustrates a soil sensor grid in communication with a controller.
Figure 2:
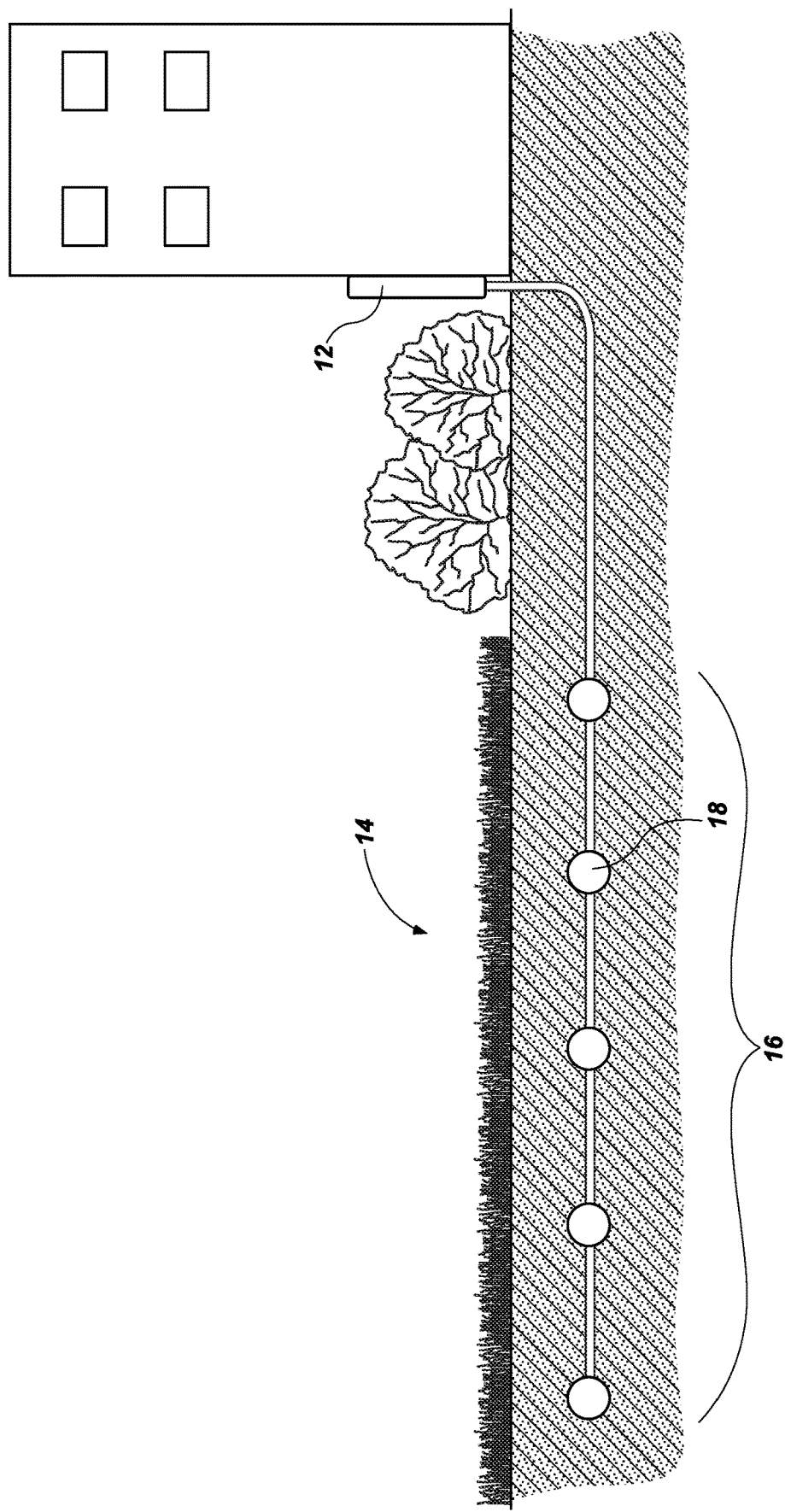
FIG. 2 illustrates a cross sectional side view of the soil sensor grid of FIG. 1 within the ground with the soil sensor grid in communication with the controller.
Figure 3:
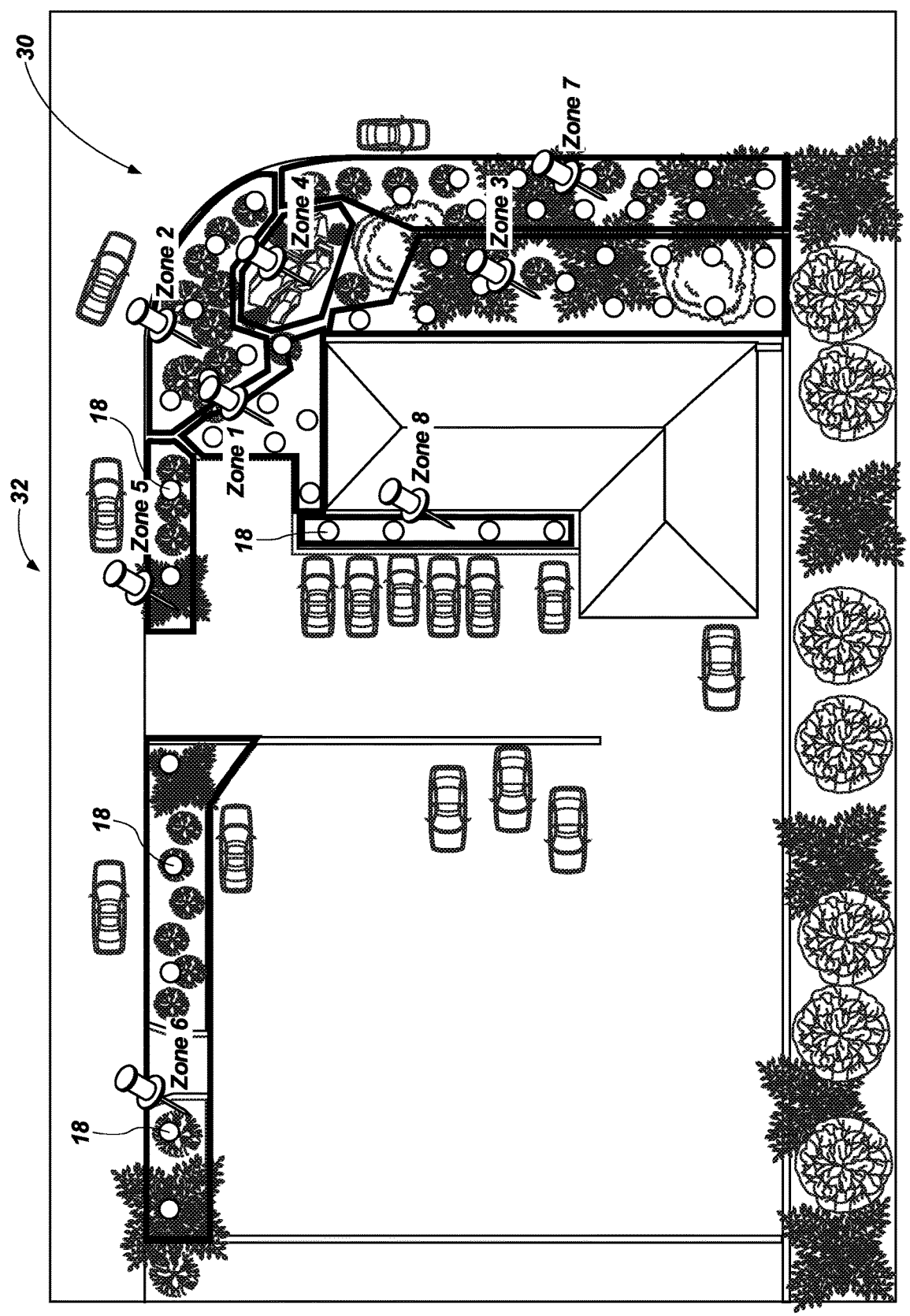
FIG. 3 illustrates an alternate embodiment of the sensor grid of FIG. 1 depicted in a commercial landscape setting.

Referring to FIG. 1, a soil sensor system 10, or moisture sensor grid, may include a controller 12, which may be a smart controller. The controller 12 may be the same controller that controls an irrigation system 30 (see FIG. 3) that will utilize the soil sensor system 10. Alternatively the controller 12 may be a different controller than an irrigation system controller but may be in communication with and provide information and data to the irrigation system 30, whether it be the same controller or separate controller. The controller 12 may be positioned in close proximity to the irrigation system controller, if they are not one in the same, and they may be linked via a centralized computer or the cloud. The controller 12 may reside within an irrigation system house, within a garage, on the side of a building or other adequate location to communicate with sensors 18 (See FIG. 2).

The controller 12 may be in communication with a plurality of sensor grids. A first sensor grid 14 may include a plurality of sensors 16 that may be in communication with each other. The controller 12 may also be individually in communication with at least one sensor 18 or the plurality of sensors 16. Each sensor 18 may be in communication with each other and the plurality of sensors 16 may be in communication with multiple sensor grids.

The first sensor grid 14 may be positioned within or underneath a lawn or grassy landscape. The first grid 14 may position sensors 18 that are equidistant from one another. The distance between each sensor 18 will vary depending on the irrigation system 30 that is utilized with the first grid 14. For example, in a substantially flat grassy landscape it may make sense to position each sensor 18 roughly one meter, or three feet, apart from the next sensor 18. The distances may vary great depending on the types of sprinkler heads, sprinklers, amount of water flow, water timing and other factors utilized in irrigation management as well as the landscape being irrigated. For instance, if the landscape has numerous hills or valleys a greater number of sensors may be utilized toward the top of peaks and less in the valleys, or vice versa. Or the sensors 18 may be positioned continually equidistant across the landscape regardless of the landscape or the other factors previously mentioned.

A second sensor grid 20 may be in communication with the controller 12 and may have sensors 18 positioned in a pattern to mimic the landscape above where the second sensor grid 20 is positioned under the ground. A third sensor grid 22 may also be in communication with the controller 12 and may have multiple sensors 18 distributed in a pattern as well It will be appreciated that the number of sensor grids is not limited to one, two or three, but rather any number of sensor grids may be utilized to relay soil moisture information to the controller 12. While three grids may have been previously disclosed, any number of grids and any number of controllers is contemplated herein. Likewise, any number of sensors within a sensor grid is also contemplated herein.

The sensors 18 may be in communication with each other either through wired or wireless relay. Alternatively they may simply be wired in a single line, or multiple lines. The sensors 18 may communicate with each other and some may be wired while others are wireless. For example a first set of sensors 24 may be wired together and in communication with the controller 12. A second set of sensors 26 may be wirelessly communicating with the first set 24 wherein the second set 26 obtains the information about the soil moisture content and relays it to the first 24 which then relays the information to the controller 12. This relay of information may be mimicked or copied for any number of sets of sensors and each subsequent set of sensors relays the information to the previous set of sensors until the information is relayed to the controller 12 itself.

Alternatively, a first set of sensors 24 may be wired to the second set of sensors 26 and the second set 26 is wired to a third set, and so on and so forth wherein each subsequent set of sensors is wired to the previous set sending an electrical signal of moisture content of the soil back to the controller. In a wired platform the electrical signal may be relayed or may simple be directly sent to the controller 12 without relay through data lines. In a wired configuration the wire may need to be buried under the surface of the landscape at a distance that will not allow the wire to be cut or chopped by landscaping tools such as lawnmowers or weed trimmers. The wires utilized may need to be robust enough to withstand landscaping tools. Furthermore, the wires and wired sensors may be required to be manually buried in the ground in the pattern as necessitated by the landscape. The distance the wires and sensors may need to be buried may vary, again, depending on the landscape and then alternatively depending on the soil content. However, a number of centimeters, 2-10 cm, or 1-4 inches. In a wired configuration power may be supplied to the sensors 18 via the wire or power conduit that may be part of or coupled to the data line.

In a wireless configuration the wireless sensors may need to be positioned in such a manner that they may communicate with the controller 12. Certain wireless sensors, such as ZigBee® sensors (amongst other wireless sensors), may be utilized to communicate with the controller and allow the moisture content of the soil to be uploaded to the controller 12. The wireless sensors may individually utilize a relay to communicate with the controller 12, particularly for those sensors that are at a distance where they could not communicate with the controller 12 directly. For those wireless sensors that are close in proximity to the controller 12 each wireless sensor may individually provide the moisture content of the soil information to the controller 12 directly. Wireless sensors may be manually installed into the ground or may be installed via a plug-style installation. Likewise, these sensors may need to be inserted into the soil at optimum lengths below the service between 2-10 centimeters depending on the soil content and landscape. In a wireless configuration the sensors 18 may each be individually battery powered or multiple sensors 18 may be coupled to a single battery pack. The sensors may also be continually on or may turn on and off at certain times or intervals to make them the most effective. For example, the sensor 18 may turn on early in the morning for an interval of time to gather the moisture content data and relay that data to the controller 12 and then shut off. Alternatively, the sensor 18 may turn on multiple times per day (e.g. morning, midday, night) and relay the information to the controller 12. After information is relayed to the controller 12 each time the sensor 18 will turn off, thus conserving power. The wired or wireless versions of sensors 18 may sense in a number of capacities and may be on continually or may turn off and on as the examples provided describe.

As a means of moisture sensing a sensor 18 may sense in such a manner as to "turn on" if the there is sufficient water whereas a sensor 18 may remain off if there is not enough moisture to "turn on" the sensor. Essentially like a switch that is activated by the presence of water. Alternatively, the sensor 18 may turn on when water is not sufficiently present to notify a user that water is required.

Wireless sensors 18 will be required to only be buried in the ground to a depth that will allow them to continue to relay information wirelessly to the controller 12. Wired sensors 18 may not have the restriction on depth of the sensor in order to continue to relay information to the controller 12.

It will be appreciated that there are a number of alternatives that may be used to relay information from the sensors 18 to the controller 12; such as, having a localized hub displaced throughout each grid which hub may gather the information and communicate with the controller 12.

The controller 12 may communicate information to the irrigation system 30 based on the feedback from the sensors 18. Computer software may be utilized, which may be cloud based software, which allows the sensors and irrigation system 30 to communicate with one another. Each sensor 18 may have an identifying number that corresponds with a location in the irrigation system 30. The sensors 18 may provide soil moisture content to the controller 12 daily or multiple times per day. The sensors 18 upload that information to the controller 12 and the controller 12 may relay that information to the cloud based software. The information provided by the sensors 18 may then be reported to Google® Earth or other overlay image 32 of the property that shows the moisture content at those sensor locations and how they may correspond to zones in an irrigation system 30 (refer to FIG. 3).

The soil moisture content from the sensor(s) 18 information may be relayed to multiple individuals or users, including landscapers, installers, owners, and others. Each sensor 18 may be depicted on the overlay image 32 and may be color coated (e.g. green=sufficient water, yellow=low water, red=insufficient water), or other user friendly interface, to show the status of each location in a landscape corresponding with a zone of the irrigation system 30.

The software that communicates with the irrigation system 30 and the soil sensor system 10 may include actions to be taken by the irrigation system 30 depending on the moisture content provided from the sensors 18 to the controller 12. For example, one action that may be relayed is the need to water a specific zone (or even a specific sprinkler head) if the moisture content from a specific sensor 18 is too low. Another possible action may be to stop watering a specific zone (or even a specific sprinkler) if the moisture content for a specific sensor 18 is too high. The moisture sensor 18 may be sensitive enough and provide such real time information to communicate with the irrigation system 30 such that optimal water is provided to each zone and/or sprinkler.

It may be possible to provide optimal moisture continually with the system disclosed herein or it may only be necessary to utilize on a daily basis so as not to have irrigation systems continually turning off and on as information is relayed from the sensors 18. The system 10 may then allow for real time and property specific moisture levels rather than relying on evapotranspiration (ET) rates or relying on factors associated with temperature, rain, weather forecasts, etc. Essentially it is similar to real time ET rates.

Figure 4:
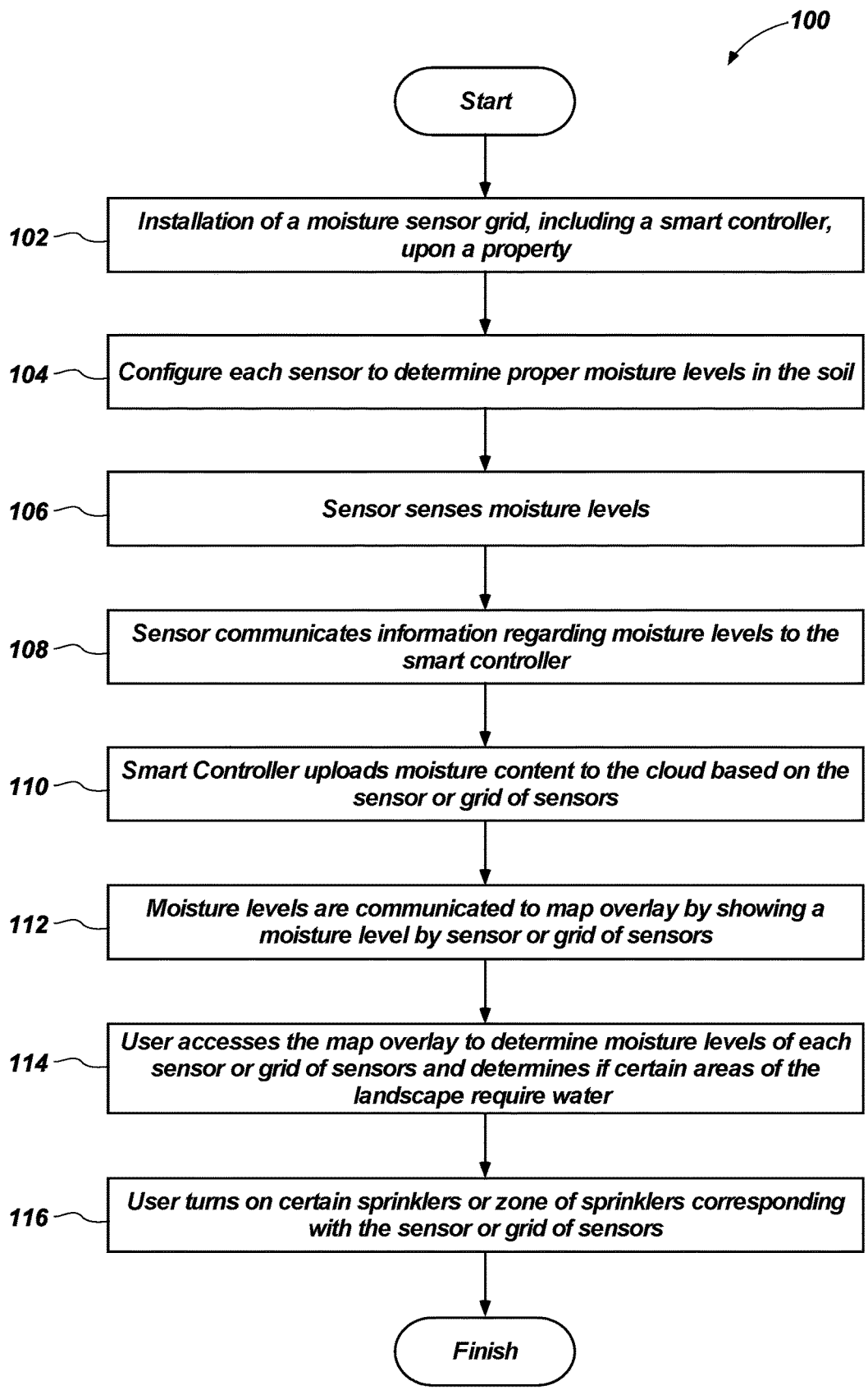
FIG. 4 illustrates a flow chart diagram illustrating one embodiment of a method of managing an irrigation system with sensors or a sensor grid.

Referring to FIG. 4, one embodiment of a method 100 for providing moisture content to the cloud or to the cloud and ultimately to a user is contemplated. The method 100 may begin and reference numeral 102, with the installation of moisture sensors 18, or a sensor grid, as well as a smart controller 12 on the property. Installation may require different sensors 18 and different numbers of sensors based on the landscape. Furthermore, the depth of the sensors will also be considered depending on the sensors utilized. Each of the sensors 18 may require configuration 104 for the location that the sensor is installed. For example more sensors or different moisture levels may be required for a lawn or grassy area versus a location with only shrubs and trees.

The moisture sensors may sense the moisture levels 106 in the soil they are installed in. The moisture levels may be determined a number of ways which are well known in the art for a sensor to provide a moisture reading in the soil. For example a sensor 18 may measure soil moisture tension in kilopascals (kPa) and determine that if the sensors relay information that the measurement is in the range of −10 kPa to −35 kPa (or anywhere there between) that water may be needed. While these ranges are purely illustrative levels below the and above those numbers may require watering as well and these ranges may be expanded depending on the types of irrigation, such as agricultural irrigation, including tree crops, versus commercial irrigation versus residential irrigation. Furthermore the landscape will determine different ranges as well. The sensor may relay information 108 regarding the moisture levels to the smart controller. The data, or information, provided to the smart controller may be simple or complex. The sensor may provide such as the exact moisture content of the soil or it may relay only enough data or information to the smart controller to let it know that the soil in that area needs water or doesn't need water, is too dry or is too wet, or that the moisture level is satisfactory.

The information, or data, provided by the sensors to the smart controller may then be uploaded 110 to the cloud, or the cloud based software. The data on the cloud may then be dispersed but may ideally be utilized by the property owner or manager, the landscape manager or the person responsible for the irrigation system. The data provided allows a user to utilize the data to manage water usage on the landscape in a more efficient manner.

Moisture levels relayed to the cloud may be communicated 112 to a map overlay, such as Google® Earth or similar that shows a map of the property with the landscape. The map overlay may be comprised of a map showing the positioned sensors, or the sensor grid, and the output data from each sensor on the map. The map may also show individual sprinklers or sprinkler zones. A user may be able to access 114 the map to see the moisture levels of the landscape. The map may provide information to the user in a color format, number format or other user friendly format to communicate the moisture level to the user. As previously disclosed it may be as simple as a color scheme of green means sufficient water, yellow means low water, and red means no water or similar. A user may be able to click on, or push, or tap each individual sensor on the map screen and determine its moisture level.

The user may turn on or off 116 sprinklers, or zones of sprinklers, based on the data provided by the sensors or sensor grid. A user may be able to click on, or push, or tap on each sprinkler or zone of sprinklers to determine what sprinklers are in the vicinity of which sensors. The user may be able to tap on each sprinkler, or zone of sprinklers, and with each tap or click, or push, control each sprinkler, or zone of sprinklers, from the map screen.

The user may set specific duration of watering, time of day for watering, number of times to water in a day, week, month or year. Furthermore the user may manually turn off and on sprinklers, or zones of sprinklers, based on the data provided by the sensors. Alternatively, a user may set up the system 10, or may manipulate the system 10, after installation, to automatically water based on the data provided by the sensors. For example, a sensitivity level may be configured for each sensor and a user may manipulate that sensitivity level such that when the moisture level in the soil drops to a pre-determined level the sensor relays the moisture level to the smart controller and to the cloud and pre-determined moisture level sets off a trigger in the software to water that area that was notified by the sensor and thus the sprinklers will "automatically" water that area.

The data from the sensors is provided to the cloud and therefore may be accessed on any computer device with cloud access. The data access may be through cellular communication, radio frequency, Wi-Fi, wired connection (such as Ethernet or other modem).

Although the foregoing description contains many specifics, these should not be construed as limiting the scope of the invention or of any of the appended claims, but merely as providing information pertinent to some specific embodiments that may fall within the scopes of the invention and the appended claims. Features from different embodiments may be employed in combination. In addition, other embodiments of the invention may also be devised which lie within the scopes of the invention and the appended claims. The scope of the invention is, therefore, indicated and limited only by the appended claims and their legal equivalents. All additions, deletions and modifications to the invention, as disclosed herein, that fall within the meaning and scopes of the claims are to be embraced by the claims.

What is claimed:

1. A system for monitoring moisture content in a soil comprising:
   an irrigation system comprising at least one first sprinkler;
   at least one first moisture sensor and at least one second moisture sensor, wherein the at least one first moisture sensor and the at least one second moisture sensor are in communication with each other;
   a moisture sensor grid comprising the at least one first moisture sensor and the at least one second moisture sensor, wherein the moisture sensor grid provides moisture content data from the at least one first moisture sensor to the at least one second moisture sensor through a relay system;
   at least one controller in communication with the at least one first moisture sensor;
   a cloud based platform in communication with at least one of the at least one controller and the at least one moisture sensor;
      the cloud based platform configured to receive the moisture content data from at least one of: the at least one controller, the at least one first moisture sensor, and the at least one second moisture sensor, the cloud based platform further configured to communicate the moisture content data to a third-party map overlay;
   wherein the irrigation system, in response to receiving input from the cloud based platform, performs one of either watering more or watering less based on the moisture content data;
   the third-party map overlay comprising a satellite image of the moisture sensor grid displayed overlaid on the satellite image at a location of the moisture sensor grid, the at least one first sprinkler displayed overlaid on the satellite image at a location of the at least one first sprinkler, and moisture content data from the at least one first moisture sensor displayed overlaid on the satellite image at a location of the first moisture sensor;
   wherein the moisture content data displayed is based on both the satellite image relating to the location of the first moisture sensor and moisture sensor data from the at least one first moisture sensor, and wherein the moisture content data is displayed on the third-party map overlay as a color-coded moisture sensor comprising at least one of: a green color-coded moisture sensor to indicate sufficient moisture, a yellow color-coded moisture sensor to indicate less than sufficient moisture, and a red color-coded moisture sensor to indicate no moisture; and
   a user interface displaying the map overlay with real-time output data from the at least one first moisture sensor, the user interface further comprising selections for the user to adjust a sensitivity level of the at least one first moisture sensor to a predetermined sensitivity level, such that when a moisture level in the soil drops to the predetermined sensitivity level the at least one first moisture sensor relays the moisture content data to the controller and to the cloud based platform, and the irrigation system waters in response to the moisture content data.

2. The system of claim 1, wherein one of the at least one first moisture sensor or the at least one second moisture sensor communicates solely to the at least one controller via the relay system.

3. The system of claim 2, wherein the at least one first moisture sensor and the at least one second moisture sensor comprise a plurality of sensors; and
   wherein the at least one controller comprises a plurality of controllers.

4. The system of claim 3, wherein the user interface is configured to allow a user to manipulate the irrigation system and to manipulate the plurality of sensors to adjust for at least one of sensitivity and changes to landscape.

5. The system of claim 4 further comprising:
   a cloud based software configured to receive data from the plurality of sensors, wherein the cloud based software stores instructions that when executed by a processor cause the processor to perform instructions, the instructions comprising:
   receiving data from the plurality of moisture sensors;
   transferring data to the user interface; and
   allowing a user to control the plurality of controllers from the user interface based on the data from the plurality of moisture sensors.

6. The system of claim 2, wherein the system further comprises a power source for selectively powering the at least one first moisture sensor and the at least one second moisture sensor and selectively de-powering the at least one first moisture sensor and the at least one second moisture sensor after the moisture content data has been communicated to the cloud based platform.

7. The system of claim 2, wherein the system further comprises a power source for selectively powering the at least one first moisture sensor and the at least one second moisture sensor when a predetermined moisture level is reached.

8. The system of claim 2, further comprising a localized hub, each of the first moisture sensor and the second moisture sensor in communication with the localized hub, and the localized hub in communication with the at least one controller and configured to communicate the moisture content data to the at least one controller.

9. A system for optimizing irrigation in a soil comprising:
an irrigation system comprising at least one smart controller;
a moisture sensor grid comprising:
a plurality of moisture sensors installed in the soil in a grid format,
wherein the moisture sensor grid provides moisture content data from at least one of the plurality of moisture sensors to another of the plurality of moisture sensors to the at least one smart controller via a relay system;
a cloud based platform in communication with at least one of the at least one smart controller and the moisture sensor grid;
the cloud based platform configured to receive the moisture content data from the plurality of sensors;
wherein the irrigation system, in response to receiving communication from the cloud based platform, performs one of either watering more or watering less at a position within the moisture sensor grid; and
a map overlay comprising the plurality of moisture sensors shown overlaid on a satellite image of a property at a location of the plurality of moisture sensors; and
a user interface displaying the map overlay with real-time output data from the at least one of the plurality of moisture sensors and from the satellite image of the property at the location of the at least one of the plurality of moisture sensors, the user interface displaying the at least one of the plurality of moisture sensory as green at a satellite image of the at least one of the plurality of moisture sensors when the real-time output data indicates sufficient moisture at the at least one of the plurality of moisture sensors, yellow at a satellite image of the at least one of the plurality of moisture sensors when the real-time output data indicates less than sufficient moisture at the at least one of the plurality of moisture sensors, and red at a satellite image of the at least one of the plurality of moisture sensors when the real-time output data indicates no moisture at the at least one of the plurality of moisture sensors;
wherein the user interface displaying the map overlay with real-time output data from the at least one of the plurality of moisture sensors further comprises selections for the user to adjust a sensitivity level of the at least one of the plurality of moisture sensors to a predetermined sensitivity level, such that when the moisture level in the soil drops to the predetermined sensitivity level the at least one of the plurality of moisture sensors relays the moisture content data to the controller and to the cloud bayed platform, and the irrigation system waters in response to the moisture content data.

10. The system of claim 9, wherein the cloud based platform is configured to receive moisture content data from at least one of that at least one smart controller or the moisture sensor grid; wherein the plurality of moisture sensors are equidistant from each other.

11. The system of claim 10 further comprising: a computer wherein the computer comprises a desktop computer, a tablet, a laptop, or a smartphone.

12. The system of claim 11, wherein the user interface is configured to allow a user to manipulate the irrigation system and to manipulate the plurality of moisture sensors to adjust for at least one of sensitivity and changes to landscape.

13. The system of claim 12 further comprising:
a cloud based software configured to receive data from the moisture sensor grid, wherein the cloud based software stores instructions that when executed by a processor cause the processor to perform instructions, the instructions comprising:
receiving data from the moisture sensor grid;
transferring data to the user interface; and
allowing a user to control the plurality of controllers from the user interface based on the data from the moisture sensor grid.

14. A method for optimizing watering for an irrigation system, the method comprising the following steps in the following order:
installing at least one moisture sensor grid in a grid format in a soil on a property, the at least one moisture sensor grid comprising at least two moisture sensors;
selectively powering the at least two moisture sensors;
sensing, by the at least two moisture sensors, moisture levels in the soil of the property;
communicating the moisture levels from a first of the at least two moisture sensors to a second of the at least two moisture sensors via a relay and from the second of the at least two moisture sensors to a cloud based platform;
shutting off the at least two moisture sensors after the moisture levels are communicated to the cloud based platform;
transferring the moisture levels from the cloud based platform to a computer in communication with the irrigation system;
wherein the irrigation system, in response to receiving moisture levels from the cloud based platform, performs one of either watering more or watering less based on the moisture levels;
manipulating a sensitivity level of at least one moisture sensor, wherein the step of manipulating the sensitivity level of the at least one moisture sensor comprises a user interface displaying the at least one moisture sensor grid on the user interface overlaid on a satellite image of the property, the user interface further comprising selections for the user to adjust a sensitivity level of the at least one of the at least two moisture sensors to a predetermined sensitivity level, such that when the moisture level in the soil drops to the predetermined sensitivity level the at least one of the at least two moisture sensors relays the moisture level to the controller and to the cloud based platform, the irrigation system waters in response to the moisture level;
and displaying the at least one moisture sensor grid on the user interface overlaid on the satellite image of the property based on satellite data and moisture level data, the at least one moisture sensor grid displayed as a moisture level data-based color and a satellite data-based location overlaid on the satellite image of the property at a location of the at least one moisture sensor grid, wherein the at least one moisture sensor grid is further displayed as green to indicate sufficient moisture, yellow to indicate less than sufficient moisture, and red to indicate no moisture at the at least two moisture sensors.

15. The method of claim 14, wherein the at least two moisture sensors comprises a plurality of moisture sensors equidistant from each other.

16. The method of claim 15, wherein the moisture grid is customized for the property.

17. The method of claim 14, wherein the method further comprises installing at least one controller in communication with the at least two moisture sensors.

18. The system of claim 17, wherein the at least one controller comprises a plurality of controllers.

19. The method of claim 14, wherein transferring the moisture levels to a computer comprises communicating the moisture levels in a format, wherein the computer comprises a desktop computer, a tablet, a laptop, or a smartphone.

20. The system of claim 19 further comprising: accessing the moisture levels through the cloud based platform.

21. The method of claim 14 comprising: manipulating the irrigation system in accordance with the moisture levels sensed from the moisture sensor.

22. The method of claim 21 comprising: sending a signal to the at least one controller to water the property in accordance with the moisture levels provided by the moisture sensor.

* * * * *